Dec. 26, 1950     P. MUELLER     2,535,592
CHEESE PRESS
Filed April 25, 1947     2 Sheets-Sheet 1
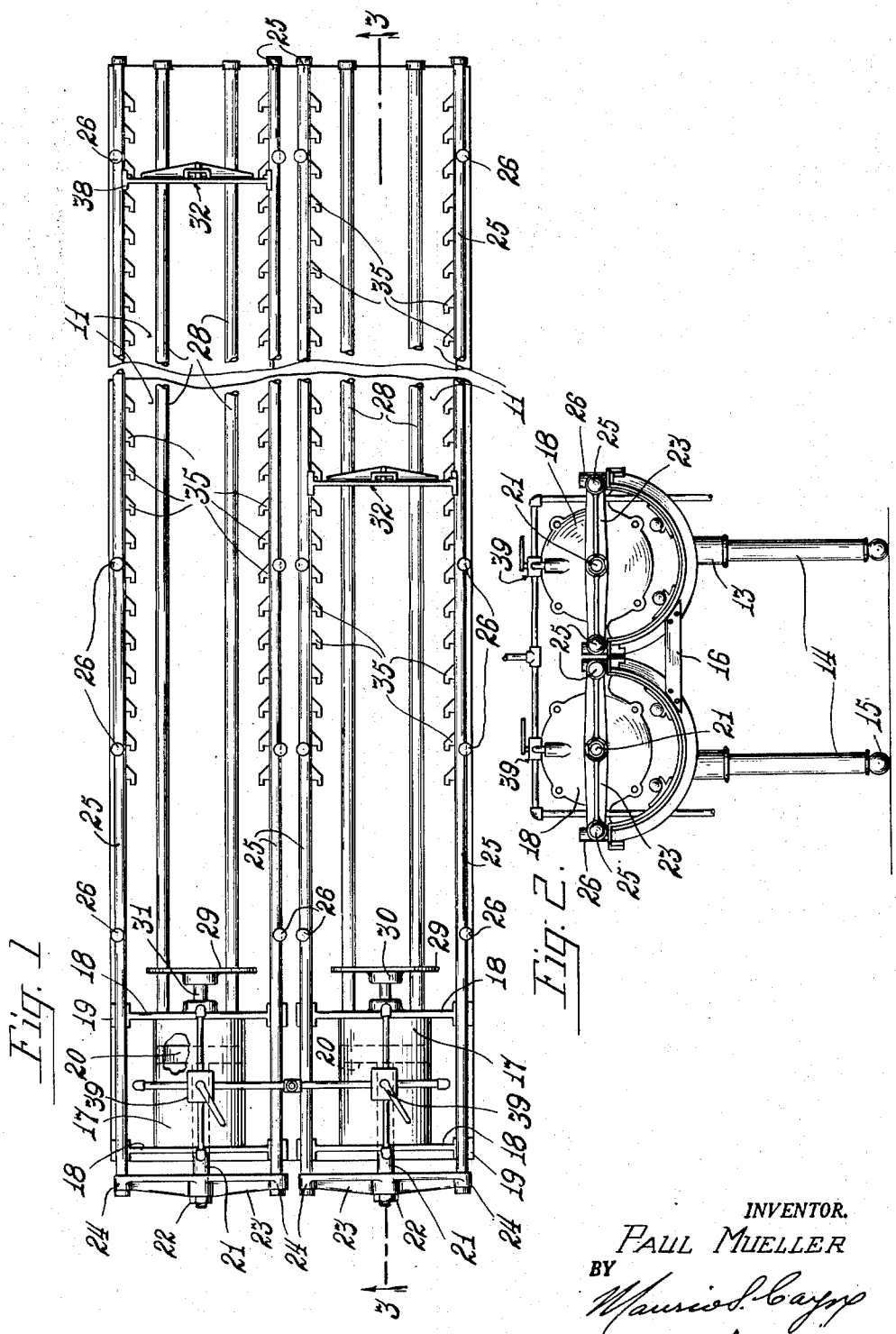
INVENTOR.
PAUL MUELLER
BY
*Maurice S. Cappy*
ATTORNEY Dec. 26, 1950 P. MUELLER 2,535,592
CHEESE PRESS
Filed April 25, 1947 2 Sheets-Sheet 2
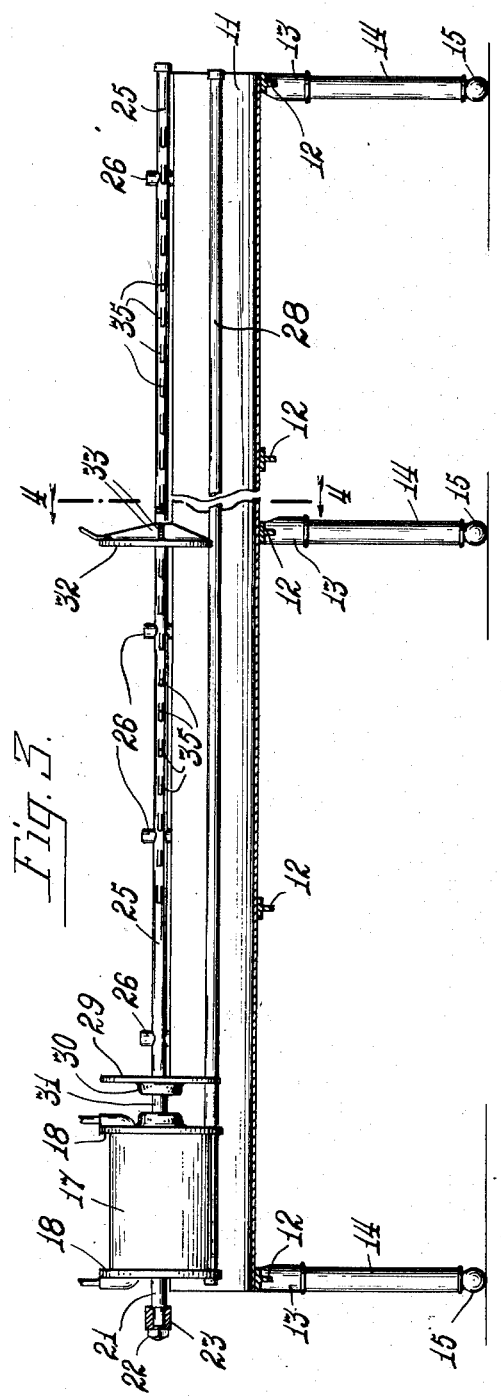
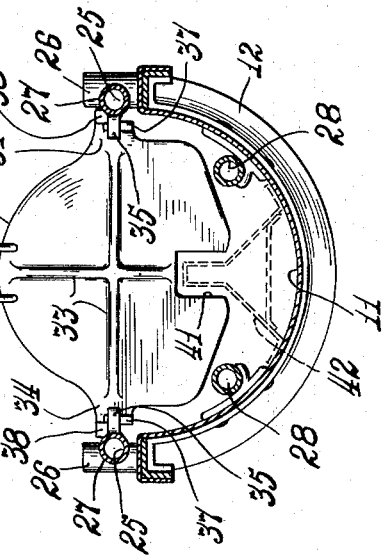
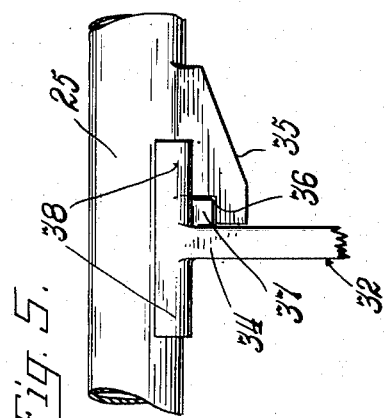
INVENTOR.
PAUL MUELLER
BY
ATTORNEY Patented Dec. 26, 1950

2,535,592

UNITED STATES PATENT OFFICE 2,535,592

CHEESE PRESS

Paul Mueller, Springfield, Mo., assignor to Paul Mueller Company, Springfield, Mo., a corporation of Missouri Application April 25, 1947, Serial No. 743,826

2 Claims. (Cl. 100—55)

The invention relates to improvements in cheese presses, and particularly to the novel features of construction embodied in a horizontal hydraulic cheese press.

In the manufacture and processing of cheese, the cheese is placed in what is commonly termed "cheese hoops" and the hoops with the cheese therein are placed in a cheese press and progressively subjected to sufficient pressure to extract the water and whey therefrom. When a predetermined amount of water and whey have been pressed out of the cheese, it is held under compression for a period of time, determined by the character of the cheese being processed, after which the hoops are removed from the press and the cheese is taken out of the hoops.

Horizontal hydraulic cheese presses usually embody a construction requiring the use of customary screw or ratchet devices for adjusting the position of a plate or ram backing the cheese hoops so as to position the cheese hoops for action thereon by the hydraulic pressure means. Such presses are not entirely satisfactory in use because of the bulk and complexity of the screw or ratchet ram means, which not infrequently is dislodged and results in injury to the attendants, and further because the use of such devices increases the labor required to clean and maintain the presses in a sanitary condition.

It is therefore an object of the present invention to provide a hydraulic cheese press with novel means to effect simple adjustment of the hydraulically actuated ram plate.

Another object is to provide a horizontal cheese press of a kind that is highly efficient in use and which involves but a minimum number of moving parts, all of which may be easily and quickly disassembled for cleaning and reassembled.

Another object of the invention is to provide a cheese press with novel, easily actuated means for progressively adjusting the ram of a hydraulic press to compensate for progressive compression of the cheese contained therein.

Another object is to provide a simple, durable horizontal cheese press which is not expensive to manufacture and which is easy to operate and highly efficient in operation and use.

Other and further objects of the present invention will be apparent from the following description and claims and are illustrated in the accompanying drawing. Other embodiments of the invention embodying the same principle may be used and structural changes may be made as desired by those skilled in the art without departing from the present invention and a purview of the appended claims.

In the drawings:

Fig. 1 is a horizontal plan view showing a cheese press embodying the features of the present invention.

Fig. 2 is an end elevational view of the cheese press viewed from the end having the hydraulic means thereon.

Fig. 3 is a longitudinal central sectional view through one of the cheese troughs, taken substantially on line 3—3 of Fig. 1 but showing the hydraulic pressure means in elevation.

Fig. 4 is a transverse sectional view through one of the troughs, taken substantially on line 4—4 of Fig. 3.

Fig. 5 is a fragmentary detail plan view of the interconnection between the ram plate and one of its actuating rods.

Referring to the disclosure in the accompanying drawings, the cheese press preferably includes a pair of like troughs 11 co-extensive with each other and disposed closely adjacent one to the other. These troughs are fashioned from sheet material suitably shaped and supported in cradle castings 12 spaced apart throughout their length at such distances as are required to insure the desired rigidity to the assembly. A plurality of the cradle castings 12 have depending tubular socket portions 13, each adapted to receive therein a leg 14 having a ball shaped foot 15. These legs may be of any conventional construction, it being understood that either the legs 14 or the ball shaped feet 15 are adjustable relative to each other or to the sockets 13 so as to compensate for any irregularities in the surface on which the machine is placed. A brace 16, best shown in Fig. 2, may bridge the gap between the lowermost portions of the cradle castings 12 to increase the rigidity of the assembly.

The mechanism provided to effect pressing of cheese placed in the troughs 11 is the same in each trough, consequently the description will concern itself with the structure contained in one of the troughs only, it being understood that the description is applicable to the structure related to the companion trough. It should be understood further that the machine may consist of a single trough or a greater number of troughs than the pair of troughs illustrated.

Hydraulic pressure means in the form of a cylinder 17 is arranged at one end of the trough 11. This cylinder may include end plates 18, having opposed mounting ears 19 extending in a horizontal plane adapted to rest upon the upper extremity of the trough 11, in the manner shown, so as to afford means whereby the hydraulic cylinder 17 may be firmly secured to the trough 11 at one end thereof. A piston 20 operates in the cylinder 17, and it has a piston rod 21 thereon which extends out of the back end of the cylinder, as shown, and has firmly secured thereon, as by means of a nut 22, a cross-head 23. The cross-head 23 is disposed horizontally, and it is provided at each of its ends with an apertured boss 24. The cross-head 23 is of a length to dispose the bosses 24 in substantial vertical alignment with the top edges of the trough 11, and each boss is adapted to receive therein one end of a pull rod 25. These pull rods may be secured firmly to the bosses in any suitable manner, it being sufficient to note at this time that they are permanently attached thereto for all practical purposes but, of course, may be separated therefrom should their replacement or replacement of the cross-head 23 become necessary.

The pull rods 25 are of a length substantially co-extensive with the length of the trough, and they are guided along and held spaced above the upper edges of the trough by rigid guide posts 26 extending upwardly from the trough edges and spaced apart throughout the entire length thereof. Upon referring to Fig. 4 it will be observed that each of the guide posts 26 is suitably cut out on one face thereof, as at 27, to afford a circular recess to receive the pull rod 25 therein. The relation of the diameter of the recess 27 to the diameter of the pull rod 25 is such that although the pull rod may slide freely therein, it is prevented from displacement by the slight overhanging of the recess wall beyond the vertical diameter of said rod.

It should be quite evident that when hydraulic force is applied to the piston 20, so as to move the piston rod 21 outwardly of the cylinder 17, the cross-head 23 and pull rods 25 are carried therewith, such movement being limited only by the limit of movement of the piston within the cylinder. The cross-head and pull rods are returned to their initial position by the application of hydraulic pressure on the opposite side of the piston, hence it should be apparent that the pull rods 25 are capable of reciprocal movement horizontally longitudinally of the trough 11.

When cheese hoops are placed in the trough 11 they are supported above the bottom thereof by longitudinal rails 28 and are arranged at the end having the hydraulic pressure means therein. When so positioned, the foremost cheese hoop rests against a backing plate 29 which may be affixed in the trough in advance of the hydraulic cylinder 17 in any accepted manner. It is preferred, however, that the backing plate 29 include a boss 30 apertured to receive firmly a post 31 anchored firmly in the end plate 18. After the desired number of cheese hoops have been arranged in the trough, a ram plate 32 is put in place at the other end of the cheese hoops. This ram plate is best shown in Fig. 4, and it consists of a substantially circular plate having reinforcing webs 33 on the back face thereof and horizontal opposed ears 34 on each side thereof. The ears 34 are adapted to cooperate with any one set of a plurality of longitudinally spaced lugs 35 formed integral with the pull rods 25 and extending inwardly toward the trough in opposed relationship.

Each of the lugs 35 is formed with a cut-back recess 36 to receive an enlargement 37 formed integral with the back side of the ear 34. Accordingly, when the ram plate 32 is properly positioned with respect to a set of lugs 35, the enlargements 37 are interlocked with the cut-back recesses 36 to prevent lateral displacement or spreading of the pull rods when pressure is applied thereto. Angular displacement or tilting of the ram plate 32 is prevented by providing extensions 38 (Fig. 5) on the ends of the ears 34, which extensions overlie and rest snugly against a portion of the related pull rod 25.

It should be quite apparent at this time that when hydraulic pressure is admitted into the cylinder 17 to move the piston 20 rearwardly, the pull rods 25 are moved to the left, as viewed in Fig. 1, to thereby pull the ram plate 32 tightly against the cheese hoops disposed between said plate and the stop plate 29. When the maximum movement of the pull rods 25 has been attained, the hydraulic pressure means is reversed, in a manner to be described hereinafter, to return the pull rods to their initial positions. The ram plate 32 then is withdrawn from its initial position of interengagement with the pull rod lugs and repositioned against the cheese hoops, the aggregate length of which has been reduced by the previous application of pressure. The pull rods are then subjected to hydraulic pressure to again pull the ram plate 32 firmly against the cheese in the hoops. This manner of successively advancing the ram plate 32 is repeated until such time as the cheese has been compressed to its desired condition.

The introduction of hydraulic pressure to the cylinder 17 may be accomplished by any of the usual means provided to alternately direct the flow of the pressure means, which in this instance is water, to either end of the cylinder. In the present disclosure a four-way valve 39 is provided in the conduits connecting the water supply to each end of the cylinder. Obviously, selective manipulation of the valve 39 will direct the hydraulic pressure to either end of the cylinder or cut off the pressure in its entirety.

The ram plate 32 may be formed with a notch 41 on its bottom edge to accommodate a removable rack 42, which may be placed in the trough in instances where cheeses of a certain character are to be processed. It should be understood, however, that the removable rack per se does not constitute a part of the present invention, its disclosure and reference herein being solely for the purpose of explaining the presence of the recess 41 in the ram plate 32.

Although an exemplary form of the present invention has been disclosed in the accompanying drawings and described in detail hereinabove, it should be understood that the invention is capable of embodying a wide variety of modifications in detail structure without departing from the spirit of the invention or the scope of the appended claims.

I claim:

1. In a cheese pressing apparatus having a substantially U-shaped trough, a hydraulic cylinder arranged at one end of said trough, a piston having a piston rod working in said cylinder, a cross-head on said piston rod, a pair of pull rods connected at one of their ends to opposite ends of said cross-head and extending in the direction of, but beyond, the cylinder, a plurality of lugs on said pull rods, said lugs being spaced longitudinally along said pull rods and the lugs on one rod being opposed to the lugs on the other rod, and a ram plate engageable with opposed lugs on both pull rods and movable along the trough upon actuation of the piston.

2. In a cheese pressing apparatus having a substantially U-shaped trough, a hydraulic cylinder arranged at one end of said trough, a piston having a piston rod working in said cylinder, a cross-head on said piston rod, a pair of pull rods connected at one of their ends to opposite ends of said cross-head and extending in the direction of, but beyond, the cylinder, guides for said pull rods on the upper edges of said trough, a plurality of lugs on said pull rods, said lugs being spaced longitudinally along said pull rods and the lugs on one rod being opposed to the lugs on the other rod, and a ram plate engageable with opposed lugs on both pull rods and movable along the trough upon actuation of the piston.

PAUL MUELLER.

REFERENCES CITED

The following references are of record in the file of this patent:

UNITED STATES PATENTS

| Number | Name | Date |
|---|---|---|
| 179,505 | Beach | July 4, 1876 |
| 529,856 | Feldmeier | Nov. 27, 1894 |
| 577,933 | Sprague | Mar. 2, 1897 |
| 698,728 | McKinnon | Apr. 29, 1902 |
| 2,054,304 | Steinbach | Sept. 15, 1936 |
| 2,072,942 | Carver | Mar. 9, 1937 |
| 2,347,793 | Petersen | May 2, 1944 |